Jan. 10, 1956
M. H. EMRICK
2,729,834
MULTIPLE CLUTCH FORWARD AND REVERSE DRIVE
UNIT FOR TAPPING MACHINE
Filed March 10, 1953
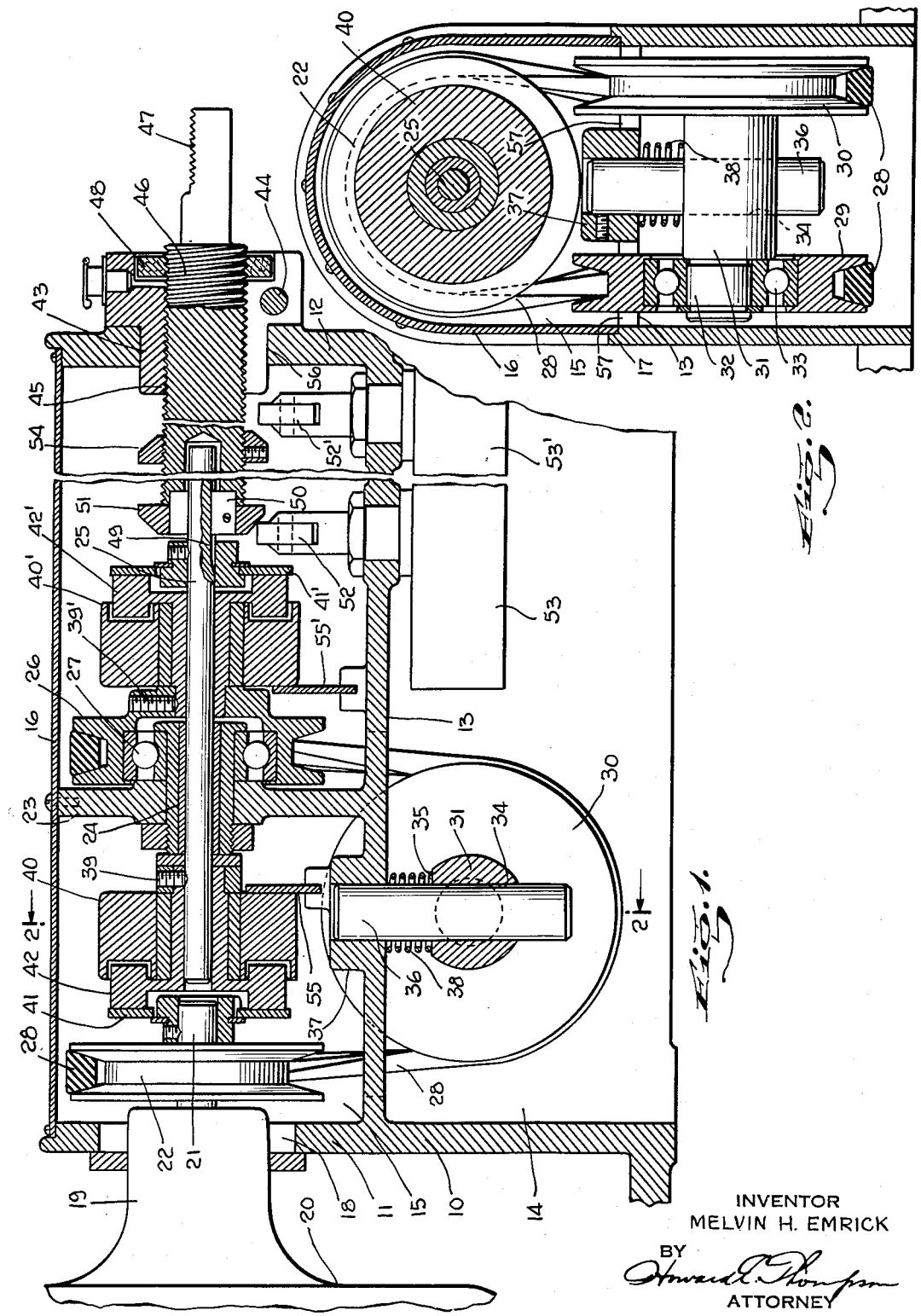
INVENTOR
MELVIN H. EMRICK
BY
Howard T. Thompson
ATTORNEY United States Patent Office 2,729,834
Patented Jan. 10, 1956

2,729,834

MULTIPLE CLUTCH FORWARD AND REVERSE DRIVE UNIT FOR TAPPING MACHINE

Melvin H. Emrick, Manhasset, N. Y.

Application March 10, 1953, Serial No. 341,394

5 Claims. (Cl. 10—136)

This invention relates to what I term lead screw tapping units. More particularly, the invention deals with a unit of this type and kind employing a forward and reverse drive pulley unit with electrically actuated clutches controlling forward and reverse drive of the lead screw and tap thereof in the actuation of the unit.

Still more particularly, the invention deals with a unit of the character described employing adjustable means controlling actuation of a reversing switch, and thus the reverse drive of the unit will engage the depth of tapping in a predetermined workpiece.

The novel features of the invention will be best understood from the following description, when taken together with the accompanying drawing, in which certain embodiments of the invention are disclosed and, in which, the separate parts are designated by a suitable reference characters in each of the views and, in which:

Fig. 1 is a longitudinal sectional view through a unit made according to my invention, with parts of the construction shown in elevation, and with parts of the structure broken away; and Fig. 2 is a section on the line 2—2 of Fig. 1, with part of the construction shown in elevation.

In the drawing, I have shown at 10 a casing or a frame of the machine, defined by spaced walls 11 and 12 joined by a connecting wall 13, the latter constituting part of a bottom housing 14 as the tapping unit is illustrated in the accompanying drawing. Above the wall 13 is a chamber 15 disposed between the walls 11 and 12, in which chamber the major portion of the operative mechanism is arranged, and this chamber is closed by a detachable casing or housing 16. Note in this connection Fig. 2. In this figure, it will appear that the side walls of the casing 10 have at their upper edges grooves, one of which is seen at 17, for receiving the side edge portions of the housing 16.

The wall 11 has a large opening 18 into which one end portion 19 of an electric motor passes. At 21 is shown the motor shaft, to which a forward drive pulley 22 is secured. The casing 10 or the wall portion 13 thereof has a partition and bearing portion 23 disposed within the chamber 15 in which a long bushed bearing 24 is arranged, the latter forming a guide and bearing for the driven shaft 25 of the unit. At 26 is shown a reverse drive pulley, having a free ball bearing mounting upon the bearing 24, as seen at 27. The drive belt 28 passes around both pulleys 22 and 26 and around two idler pulleys 29 and 30 mounted on a stub shaft 31, reduced end portions 32 of which operate in both bearings 33 in the idler pulleys. Only one of the bearings 33 is shown in section, it being understood that the other pulley is similarly mounted on the shaft 31.

The shaft 31 has a vertical bore 34 and a flat upper surface 35, note Fig. 1. A pin 36 is fixed to a bossed portion 37 of the wall 13, and between the wall 13 and pin 31 is disposed a coil spring 38 to apply the desired tension to the idler pulleys 29 and 30 and to maintain the belt 28 taut at all times. It will be apparent that the continuous belt 28 passes, for example, downwardly around the pulley 22, then around the pulley 30, and upwardly and around the pulley 26, then downwardly and around the pulley 29, and then upwardly around the pulley 22.

Secured to the end portion of the driven shaft 25 adjacent the pulley 22 as by a screw, note Fig. 1 of the drawing, is a forward drive electric clutch element 40, the part 41 of said clutch being fixed to the shaft 21 of the motor, whereas the part 42 is fixed to the shaft 25 as at 39. At 40' is shown a similar type of electric clutch wherein the part 41' is fixed to the driven shaft, whereas the other part 42' of the clutch is fixed to the pulley 26 as indicated at 39'. The positions of the two electric clutches are simply reversed, and when energized the electric pull set up in the respective clutches will control the forward and reverse drives of the shaft 25. In other words, when the shaft 25 is driven forwardly through energizing the clutch 40, then the clutch 40' is de-energized, thus allowing the shaft 25 including the part 41' to rotate freely with respect to the part 42' of the clutch, and at the same time the pulley 26 including the part 42' are free to rotate in the opposite direction. However, when the electric clutch 40' becomes energized, then simultaneously the clutch 40 will be de-energized, the clutches operating as breaking mediums momentarily. Thus the shaft 25 will be reversely driven directly from the pulley 26, at which time the pulley 22 and the part 41 will rotate freely in a direction opposite to the rotation of the part 42.

Upon completing the reverse drive of the shaft 25, or, in other words, withdrawal of a tap from a work-piece, then automatically the clutch 40' will become de-energized putting the tapping unit at rest.

To repeat the above cycle of operation, a manually actuated switch will be employed to close the circuit to energize the clutch 40 for the forward drive of the shaft 25. In the so-called idle or rest period, both of the pulleys 22, 26 can be freely rotated without contributing any drive motion to the shaft 25.

Electric clutches, such as the electric clutches 40, 40' are generally known in the trade as stationary field electric clutches. Clutches of this type and kind are practical for use in units of the kind under consideration, particularly from the standpoint that they can be utilized to control the drive which is essential in accomplishing the function of the unit, while at the same time yielding to excessive stresses or strains to which the tap or other tool may be subject. In this connection, it will be understood that, while I have specifically described my unit as applied to tapping units, this is by way of illustrating one adaptation and use of my invention. The unit, from the standpoint of forward and reverse drives control through clutches of the kind under consideration and with the drive employed, is applicable to units for performing any type or kind of operation or feed of a tool of any type or kind. In this latter connection, the use of a lead screw is not essential.

It will be noted upon consideration of Fig. 2 of the drawing, that the wall 13 has at opposed sides thereof openings 57 for reception of upper portions of the pulleys 29 and 30 as well as the belt 28.

Arranged in the wall 12 of the unit is a split bearing 43 with a clamping screw or belt shown in section at 44 in Fig. 1 passing through the unsectioned split portion of the bearing 43. The bore of the bearing 43 is threaded as seen at 45 to engage the threads of the lead screw 46, having at its outer end a tapping tool 47. The lead screw 46 passes through a lubricating bushing 48 in the bearing 43 for lubricating said lead screw in its forward and reverse drives as will be apparent.

The shaft 25 has an elongated keyway 49, and pinned to the inner end of the lead screw 46 is a key 50 to which is also secured a switch actuating disc or ring 51. The disc or ring 51 is adapted to actuate a micro or other switch 52 supported on the wall 13, a portion 53 thereof extending into the chamber 14 of the casing as diagrammatically shown, the switch 52—53 controlling automatic stopping of the reverse drive of the shaft 25, as well as bringing this shaft to rest preparatory to another cycle of operation. Adjustably supported on the lead screw 46 is another switch operating ring or collar 54, the position of which on said lead screw will control feed operation of the tap 47 into a workpiece.

At 52' is shown another micro-switch including a portion 53' extending into the chamber 14, and this latter switch is actuated by the ring or collar 54 in automatically breaking the circuit to the clutch 40 and simultaneously completing the circuit to the clutch 40, resulting in the reverse drive of the shaft 25. In the broken section shown in Fig. 1 of the drawing, no definite position of the ring 54 with respect to the switch 52' is being attempted.

It will be understood that this spacing will be gauged by the operator, and in the drawing the lead screw 46 is shown at its innermost position with the ring 51 operatively engaging the stop switch 52. It will thus be apparent that when the circuit to the clutch 40 is completed, the lead screw 46 will move to the right until the ring or collar strikes and operates the switch 52'. On the wall 13 are clutch supporting plates 55, 55' for supporting the body portion of the electric clutches which are maintained at rest at all times.

It will be apparent that my improved tapping unit can be operated with the lead screw in horizontal or vertical plane. Considering Fig. 2 of the drawing, it will appear that the entire unit comes substantially within the boundaries of the casing, with the exception that the electric motor employed may be slightly larger in diameter than the transverse width of the complete casing. The entire casing is closed however the detachable hood 16 will give quick access to the working parts of the casing whenever desired, and particularly in adjustment of the ring or collar 54, to vary the feed of the lead screw 46 including the tap 47.

It will also clearly appear from a consideration of Fig. 1 of the drawing that the aperture 56 formed in the wall 12 for reception of the bearing 43, is of such size as to facilitate withdrawal of the lead screw assemblage from the unit in substituting a new lead screw assemblage in the unit. The bearing 43 is secured to the wall 12 by screws, which are not shown, and by removing these screws and moving the switch 52' out of the path of the collars or rings 51, 54, this entire assemblage can be withdrawn from the shaft 25, and the casing and another assemblage then mounted in position. This is an advantageous feature from the standpoint of interchanging of the assemblages from time to time.

Having described my invention, what I claim as new and desire to secure by Letters Patent is:

1. A tapping unit of the class described, comprising a casing having joined end walls, with a large opening extending between said end walls, detachable means for closing the casing opening, means, in the casing between said end walls, forming a bearing support for a driven shaft extending longitudinally of the casing between said end walls, a lead screw in threaded engagement with one end wall, a drive shaft extending into the casing through the other end wall, said shafts and lead screw being in axial alinement, a drive unit comprising forward and reverse drivers, the forward driver being directly driven by said drive shaft, the reverse driver being mounted on said driven shaft, means in operative engagement with the forward driver for driving said reverse driver from said drive shaft, two independent electrically actuated two-part clutches, one clutch being arranged between the forward and reverse drivers, with one part thereof fixed to the driven shaft and the other part thereof fixed to the drive shaft to control forward drive of said driven shaft, the other clutch being arranged on the driven shaft between said reverse driver and said lead screw, said last named clutch having one part fixed to the reverse driver and the other part thereof fixed to the driven shaft, said lead screw having a sliding key coupling with the driven shaft, and means comprising a pair of switches spaced in said casing and in circuit with said clutches and a collar on said lead screw operatively engaging said switches for controlling forward and reverse drives of the driven shaft and said lead screw.

2. A tapping unit of the class described, comprising a casing having joined end walls, with a large opening extending between said end walls, detachable means for closing the casing opening, means, in the casing between said end walls, forming a bearing support for a driven shaft extending longitudinally of the casing between said end walls, a lead screw in threaded engagement with one end wall, a drive shaft extending into the casing through the other end wall, said shafts and lead screw being in axial alinement, a driven unit comprising forward and reverse drivers, the forward driver being directly driven by said drive shaft, the reverse driver being mounted on said driven shaft, means in operative engagement with the forward driver for driving said reverse driver from said drive shaft two independent electrically actuated two-part clutches, one clutch being arranged between the forward and reverse drivers, with one part thereof fixed to the driven shaft and the other part thereof fixed to the drive shaft to control forward drive of said driven shaft, the other clutch being arranged on the driven shaft between said reverse driver and said lead screw, said last named clutch having one part fixed to the reverse driver and the other part thereof fixed to the driven shaft, said lead screw having a sliding key coupling with the driven shaft, means comprising a pair of switches spaced in said casing and in circuit with said clutches and a collar on said lead screw operatively engaging said switches for controlling forward and reverse drives of the driven shaft and said lead screw, and said last named means being adjustable to control forward feed and reverse drive.

3. A lead screw tapping device of the character described, comprising an elongated casing, an internally threaded bushing in one end wall of the casing, a drive shaft extending into the casing through an opposed end wall of the casing and in axial alinement with said bushing, a lead screw in threaded engagement with said bushing, a driven shaft in axial alinement with and slidably keyed to said lead screw, forward and reverse drive electrically operated clutches mounted on and spaced longitudinally of said driven shaft between said lead screw and drive shaft, a forward driver directly driven by the drive shaft, a reverse driver mounted on the driven shaft between said clutches, means in operative engagement with the forward driver for driving said reverse driver from said drive shaft switches in circuit with and controlling operation of said clutches in actuating the driven shaft through said forward and reverse drivers, and means, on said lead screw, operatively engaging said switches for actuating said driven shaft in the forward and reverse drives of said lead screw in automatically feeding the lead screw toward and from a workpiece, and, then, bring the driven shaft and lead screw momentarily to rest.

4. A drive of the character described, comprising an elongated casing defined by end walls integrally joined by a connecting wall, said connecting wall having a bearing wall intermediate said end walls, the casing having an opening in one side extending between said end walls, a closure hood for the opening of said casing, said hood forming, within the casing, a longitudinal cylindrical chamber, an internally threaded bushing mounted in one end wall, a motor driven shaft extending into said chamber through the other end wall in axial alinement with said bushing, a driven shaft supported in said bearing wall and disposed in axial alinement with and between the bushing and the motor driven shaft, a multiple pulley drive mounted in the casing and including a forward drive pulley fixed to the motor driven shaft, a reverse drive pulley rotatably mounted on said driven shaft, a pair of electric clutches supported in the chamber of the casing and on said driven shaft, one clutch being arranged between the forward and reverse drive pulleys and having a part fixed to the motor driven shaft and placing the forward drive pulley in operative engagement with said driven shaft, the other clutch being arranged between the reverse drive pulley and said lead screw and having a part fixed to the driven shaft and a part fixed to the reverse drive pulley in placing the reverse drive pulley in operative engagement with said driven shaft, a tool supporting member in threaded engagement with said bushing and keyed to and slidably engaging said driven shaft, a pair of switch devices mounted in the casing in circuit with said clutches and extending into said chamber, one of said switch devices controlling operation of the reverse drive clutch, the other switch breaking the circuit to both of said clutches in momentarily maintaining said driven shaft and tool supporting member at rest, and means, on said tool supporting member, operatively engaging said switches, controlling reverse drive of the tool supporting member and breaking the clutch circuits at the completion of said reverse drive.

5. A device for actuating a tool in forward and reverse directions, an elongated casing, a tool actuating driven shaft arranged longitudinally of the casing, tool supporting means keyed to and movable longitudinally of said driven shaft, a drive shaft in axial alinement with one end of said driven shaft, a forward drive member fixed to said drive shaft, a reverse drive member in the casing in spaced relation to said first named member, means in operative engagement with the forward drive member for driving said reverse drive member from said drive shaft, the axis of said drive members and clutches being common with the axis of said driven shaft, electrically and independently actuated two-part clutches spaced longitudinally on said driven shaft and arranged one between said drive members and the other between the reverse drive member and said tool supporting means, one part of one clutch being positively driven by one member, one part of the other clutch being positively driven by the other member, the other parts of said clutches being fixed to said driven shaft at opposed sides of said reverse drive member, said clutches placing said members intermittently in drive connection with said driven shaft in the forward and reverse drives of said driven shaft, and automatically actuated means responsive to axial position of said tool supporting means and in circuit with said clutches for completing the circuit to the clutch operating the reverse drive member, while simultaneously breaking the circuit to the clutch operating the forward drive member.

References Cited in the file of this patent

UNITED STATES PATENTS

| | | |
|---|---|---|
| 815,433 | Johnson | Mar. 20, 1906 |
| 2,404,053 | Glover, Jr. | July 16, 1946 |
| 2,510,880 | Fredrikson | June 6, 1950 |
| 2,551,936 | Funk | May 8, 1951 |
| 2,560,081 | Brook | July 10, 1951 |

FOREIGN PATENTS

| | | |
|---|---|---|
| 520,050 | Great Britain | Apr. 12, 1940 |
| 622,668 | Great Britain | May 5, 1949 |